Aug. 14, 1928.
L. J. BECHAUD
MOTOR MOUNTING
Filed Dec. 6, 1926
1,680,843
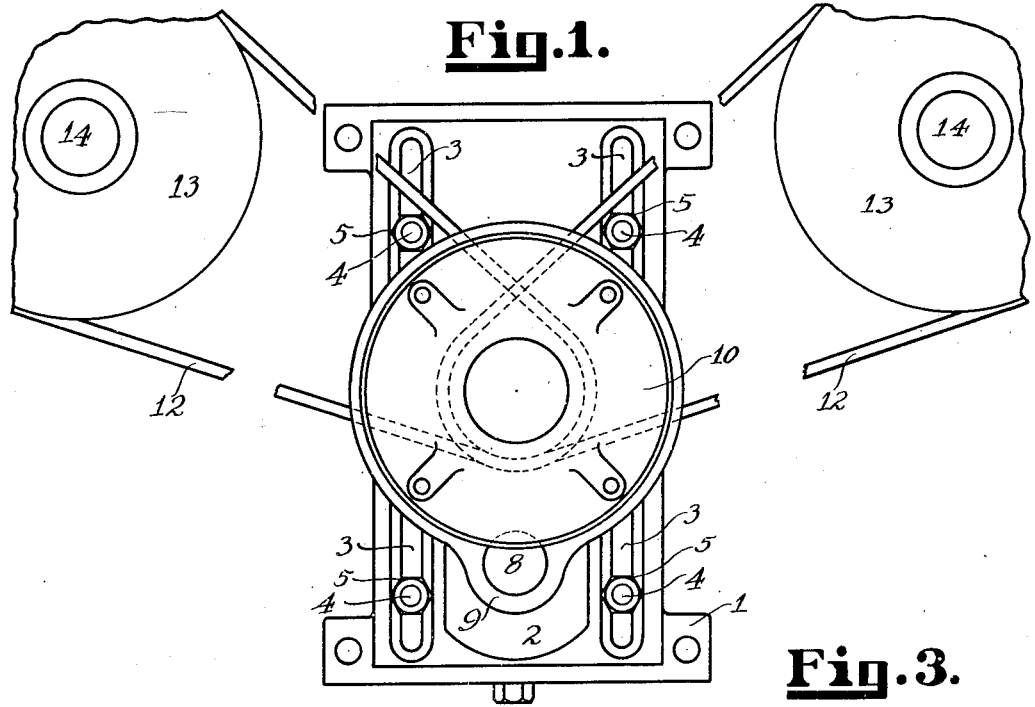
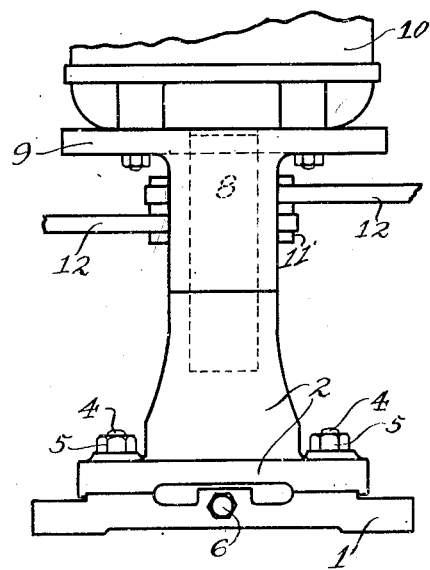
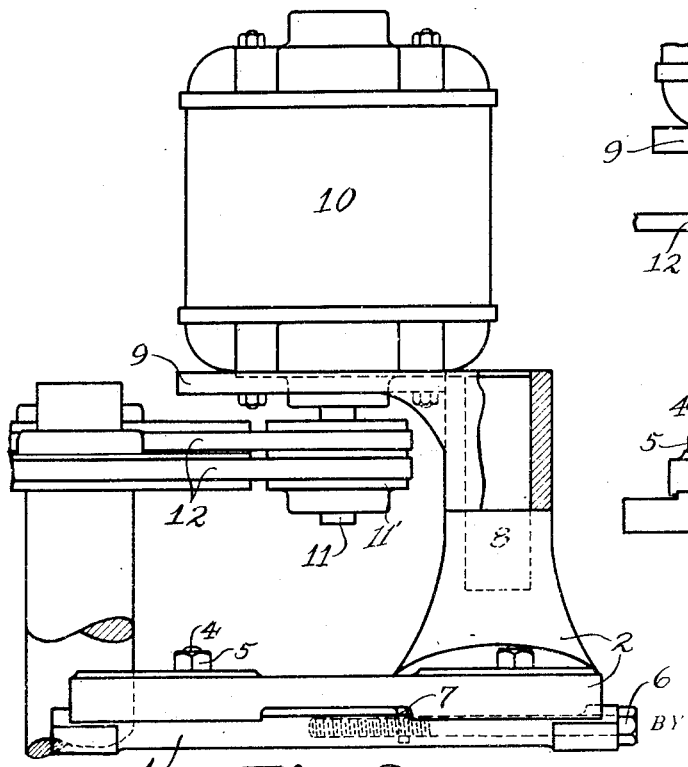
INVENTOR
Leslie J. Bechaud
BY
Harry A. Totten
ATTORNEY Patented Aug. 14, 1928.

1,680,843

UNITED STATES PATENT OFFICE.

LESLIE J. BECHAUD, OF BERKELEY, CALIFORNIA, ASSIGNOR TO BUNTING IRON WORKS, OF BERKELEY, CALIFORNIA, A CORPORATION OF CALIFORNIA.

MOTOR MOUNTING.

Application filed December 6, 1926. Serial No. 152,999.

The present invention relates to means for mounting motors or other prime movers in cases involving the transmission of power to two different shafts, through the medium of endless travelling members such as belts or chains. In such cases means must be provided to tighten the belts and at the same time maintain an even tension on both.

It is evident that if the motor be made adjustable on the center line of one belt there will be no tightening effect on the other. If the motor be made adjustable on a line bisecting the angle of the center line of the belts from the motor to the driven shafts, the tension on the belts will be equal as long as the belts remain of the same length. It is well known that belting or chain will stretch; also that no two pieces will stretch exactly the same amount. As soon as this stretching action takes place, and it is desired to tighten the belts or chain, any movement of the motor on the line above noted will throw more tension on the shorter belt, and not enough on the longer one. It is evident that both belts can never be at the proper tension for the efficient transmission of power. To meet this condition and at all times automatically maintain an equal tension on the belts is the object of this invention.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

In the accompanying drawings:—

Figure 1 is a plan view showing the means for mounting the motor and the means for longitudinally adjusting the sub-base upon the base plate.

Figure 2 is a side elevation showing the means for mounting the motor upon the sub-base.

Figure 3 is a detailed rear elevation, broken, of Figure 2.

Referring to the drawings wherein like numerals of reference designate corresponding parts, 1 indicates a base plate. Mounted and adapted for longitudinal movement upon the base plate is a sub-base 2, said sub-base being provided with slots 3.

Extending from the base plate 1 and protruding through the slots 3 are clamp bolts 4, said clamp bolts being provided with nuts 5 for securing the sub-base against adjustment when desired. An adjustment bolt 6 extends from one end of the base plate 1, one end of said bolt being adapted for threaded connection with a lug 7 recessed in the under side of the sub-base 2. A swivel pin 8 is mounted within the sub-base 2, the upper end of said pin carrying a swivel plate 9, said swivel plate and pin being free to rotate independently of the movement of the sub-base. A motor 10 is secured to the swivel plate 9 with the drive shaft 11 extending through said plate. A belt pulley 11' is mounted upon the drive shaft 11 and adapted for rotation therewith. Transmission belts 12 connect the belt pulley 11' with pulleys 13 mounted upon the driven shafts 14 disposed on relatively opposite sides.

In mounting the motor 10 upon the swivel plate 9, which is disposed eccentrically to the drive shaft of the motor, said motor is adapted to swing through an arcuate path, with the result that should one of the belts 12 become stretched more than the other, the motor will automatically swing toward the belt having the most tension, thereby keeping the tension on the belts equal at all times and insuring the efficient transmission of power. When it becomes necessary to increase the belt tension, the motor is drawn backwards by means of the adjusting bolt 6 along a line radial to the arcuate path of the motor in swinging with the pin 8 as an axis, thereby providing an equal tension upon the belts 12.

I claim:—

In combination, a prime mover having a driving shaft; driven shafts disposed on opposite sides relatively to said prime mover;

separate endless transmission members connecting said driving shaft with said driven shafts; a plate carrying said prime mover; a swivel member eccentric to the driving shaft and about which the prime mover automatically swings freely under differential tension in said transmission members; and a bed plate carrying said prime mover plate and swivel member, said bed plate having means for adjusting it along a line radial to the arcuate movement of the prime mover plate.

In testimony whereof I have signed my name to this specification.

LESLIE J. BECHAUD.